(12) United States Patent
Lin

(10) Patent No.: US 8,879,617 B1
(45) Date of Patent: Nov. 4, 2014

(54) METHOD AND CIRCUIT FOR CONTROLLING AN EQUALIZER AND EQUALIZING SYSTEM

(71) Applicant: Himax Technologies Limited, Tainan (TW)

(72) Inventor: Jin-Fu Lin, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 14/080,815

(22) Filed: Nov. 15, 2013

(51) Int. Cl.
*H03H 7/30* (2006.01)
*H04L 25/03* (2006.01)

(52) U.S. Cl.
CPC . *H04L 25/03057* (2013.01); *H04L 2025/03707* (2013.01)
USPC .......... 375/232; 375/229; 375/233; 708/322; 708/323

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

2010/0046683 A1* 2/2010 Beukema et al. ............. 375/355

* cited by examiner

*Primary Examiner* — Adolf Dsouza
(74) *Attorney, Agent, or Firm* — CKC & Partners Co., Ltd.

(57) ABSTRACT

A method and a circuit for controlling an equalizer and an equalizing system are disclosed. The method includes providing a first level from a set of levels as a peaking level of the equalizer; equalizing a transmission signal by using the equalizer with the first level to obtain a first signal; providing a second level from the set of levels as the peaking level of the equalizer; equalizing the transmission signal by using the equalizer with the second level to obtain a second signal; determining a first frequency of the first signal; determining a second frequency of the second signal; comparing the first frequency and second frequency to obtain a comparing result; and determining the peaking level of the equalizer for following equalization of the transmission signal in accordance with the comparing result.

20 Claims, 4 Drawing Sheets

METHOD AND CIRCUIT FOR CONTROLLING AN EQUALIZER AND EQUALIZING SYSTEM

BACKGROUND

1. Field of Invention

The present invention relates to a method and a circuit for controlling an equalizer, and an equalizing system.

2. Description of Related Art

An equalizer is provided to compensate a signal for high-frequency loss in signal transmission. An equalization gain of the equalizer varies according to a peaking level. However, the signal may be interfered, and thus the signal contains a high-frequency component. After passing through the equalizer, the high-frequency component may be over-compensated. For applications of differential transmission technology, if a large intra-pair skew between a positive signal and a negative signal is present, a significant high-frequency component is generated and added to a transmission signal mixed from the two channels carrying the positive signal and the negative signal respectively. After passing through the equalizer, the high-frequency component of the transmission signal is amplified. Hence, spikes are produced in the equalized transmission signal, which may cause a phase-locked loop (PLL) circuit to lock to a phase and frequency different from that of the original transmission signal.

SUMMARY

The invention discloses a method and a circuit for controlling an equalizer, and an equalizing system for determining if a phase and frequency are correctly locked. A peaking level of the equalizer continues being turned lower until the determination result indicates that the phase and frequency are correctly locked. Therefore, both high equalization gain for high-frequency component of the transmission signal without over-compensation and the correctness of frequency lock are ensured.

An aspect of the present disclosure is to provide a method for controlling an equalizer. The method includes providing a first level from a set of levels as a peaking level of the equalizer; equalizing a transmission signal by using the equalizer with the first level to obtain a first signal; providing a second level from the set of levels as the peaking level of the equalizer; equalizing the transmission signal by using the equalizer with the second level to obtain a second signal; determining a first frequency of the first signal; determining a second frequency of the second signal; comparing the first frequency and second frequency to obtain a comparing result; and determining the peaking level of the equalizer for following equalization of the transmission signal in accordance with the comparing result.

In one or more embodiments, if the comparing result indicates that the first frequency is substantially the same as the second frequency, the method further includes setting the second level as the first level; setting a new level from the set of levels as the second level; and repeating the equalizing steps with the first level and the second level.

In one or more embodiments, the peaking level is determined to be the second level for following equalization of the transmission signal if the comparing result indicates that the second frequency is substantially lower than the first frequency.

In one or more embodiments, the second level is lower than the first level.

In one or more embodiments, the first frequency and the second frequency is determined by counting rising or falling edges of the first signal and the second signal in a time period respectively.

In one or more embodiments, the set of levels is stored in a look-up table.

Another aspect of the present disclosure is to provide a circuit for controlling an equalizer. The circuit includes a sampler, a comparator and a selector. The sampler is for determining a first frequency of a first signal and a second frequency of a second signal, wherein the first signal is obtained from equalizing a transmission signal by using the equalizer with the first level as a peaking level of the equalizer, and the second signal is obtained from equalizing the transmission signal by using the equalizer with the second level as the peaking level of the equalizer. The comparator is coupled to the sampler for comparing the first frequency and the second frequency to obtain a comparing result. The selector is coupled to the comparator for determining the peaking level of the equalizer for following equalization of the transmission signal in accordance with the comparing result.

In one or more embodiments, the first level and the second level are provided from a set of levels stored in a look-up table.

In one or more embodiments, if the comparing result indicates that the first frequency is substantially the same as the second frequency, the selector sets the second level as the first level and sets a new level from the set of levels as the second level, and the equalizer equalizes the transmission signal with the set first level and the set second level to obtain the first signal and the second signal respectively.

In one or more embodiments, the selector determines the peaking level to be the second level for following equalization of the transmission signal if the comparing result indicates that the second frequency is substantially lower than the first frequency.

In one or more embodiments, the second level is lower than the first level.

In one or more embodiments, the circuit further includes a counter. The counter is coupled to the sampler for counting rising or falling edges of the first signal and the second signal in a time period for the sampler to determine the first frequency and the second frequency respectively.

Another aspect of the present disclosure is to provide an equalizing system. The equalizing system includes an equalizer and a detector. The equalizer is for equalizing a transmission signal with a first level as a peaking level thereof to obtain a first signal and for equalizing the transmission signal with a second level as the peaking level to obtain a second signal. The detector is coupled to the equalizer for detecting the first signal and the second signal. The detector includes a sampler, a comparator and a selector. The sampler is for determining a first frequency of a first signal and a second frequency of a second signal, wherein the first signal is obtained from equalizing a transmission signal by using the equalizer with the first level as the peaking level, and the second signal is obtained from equalizing the transmission signal by using the equalizer with the second level as the peaking level. The comparator is coupled to the sampler for comparing the first frequency and the second frequency to obtain a comparing result. The selector is coupled to the comparator for determining the peaking level of the equalizer for following equalization of the transmission signal in accordance with the comparing result.

In one or more embodiments, the first level and the second level are provided from a set of levels stored in a look-up table.

In one or more embodiments, if the comparing result indicates that the first frequency is substantially the same as the second frequency, the selector sets the second level as the first level and sets a new level from the set of levels as the second level, and the equalizer equalizes the transmission signal with the set first level and the set second level to obtain the first signal and the second signal respectively.

In one or more embodiments, the equalizing system further includes a memory unit for storing the look-up table.

In one or more embodiments, the selector determines the peaking level to be the second level for following equalization of the transmission signal if the comparing result indicates that the second frequency is substantially lower than the first frequency.

In one or more embodiments the second level is lower than the first level.

In one or more embodiments, the circuit further includes a counter. The counter is coupled to the sampler for counting rising or falling edges of the first signal and the second signal in a time period for the sampler to determine the first frequency and the second frequency respectively.

In one or more embodiments, the equalizing system further includes a divider. The divider is coupled between the equalizer and the detector for dividing the first signal and the second signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
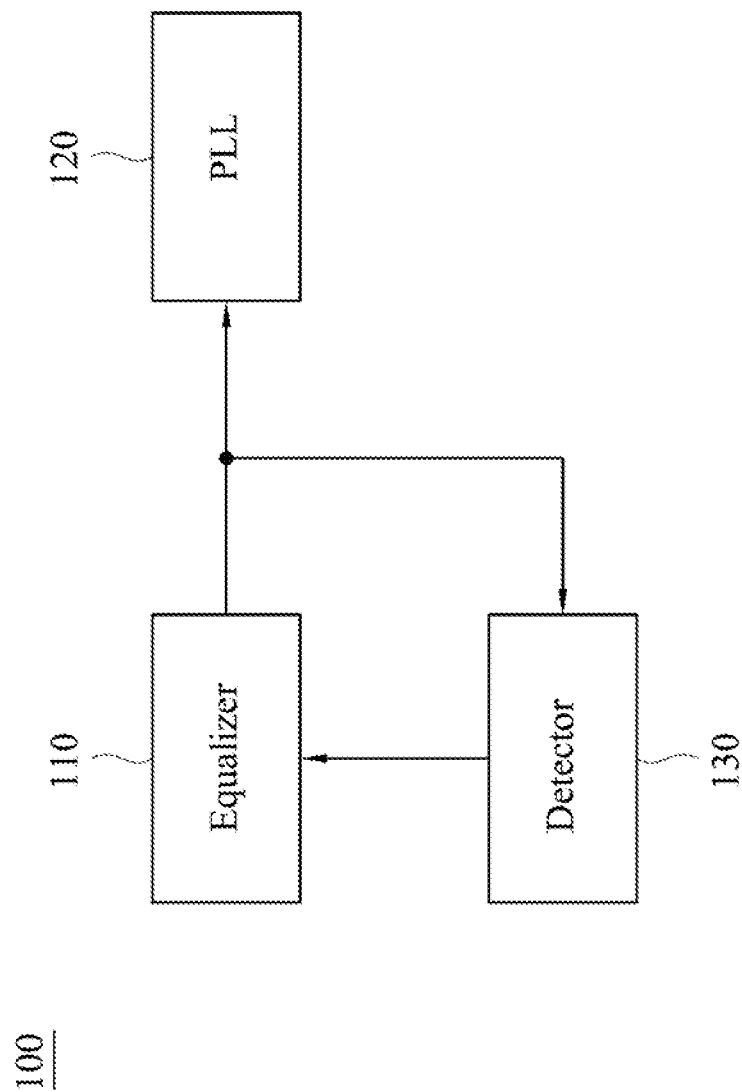
FIG. 1 is a schematic diagram of an equalizing system in accordance with some embodiments of the invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, which is a schematic diagram of an equalizing system 100 in accordance with some embodiments of the invention. In FIG. 1, the equalizing system 100 includes an equalizer 110, a phase-locked loop (PLL) circuit 120 and a detector 130. The equalizer 110 equalizes a transmission signal with a peaking level to obtain an equalized transmission signal. By passing through the equalizer 110, a high-frequency component of the transmission signal is amplified. The equalization gain for the high-frequency component depends on the peaking level.

The PLL circuit 120 locks to a phase and frequency by processing the equalized transmission signal. The detector 130 detects the equalized transmission signal for determining if the PLL circuit 120 locks to the correct phase and frequency according to the equalized transmission signal. If the detector 130 determines that the PLL circuit 120 fails to lock to the correct phase and frequency according to the equalized transmission signal, the peaking level of the equalizer 110 is turned lower for equalizing the transmission signal. The peaking level continues being turned lower until the detector 130 determines that the PLL circuit 120 locks to the correct phase and frequency according to the equalized transmission signal.

Figure 2:
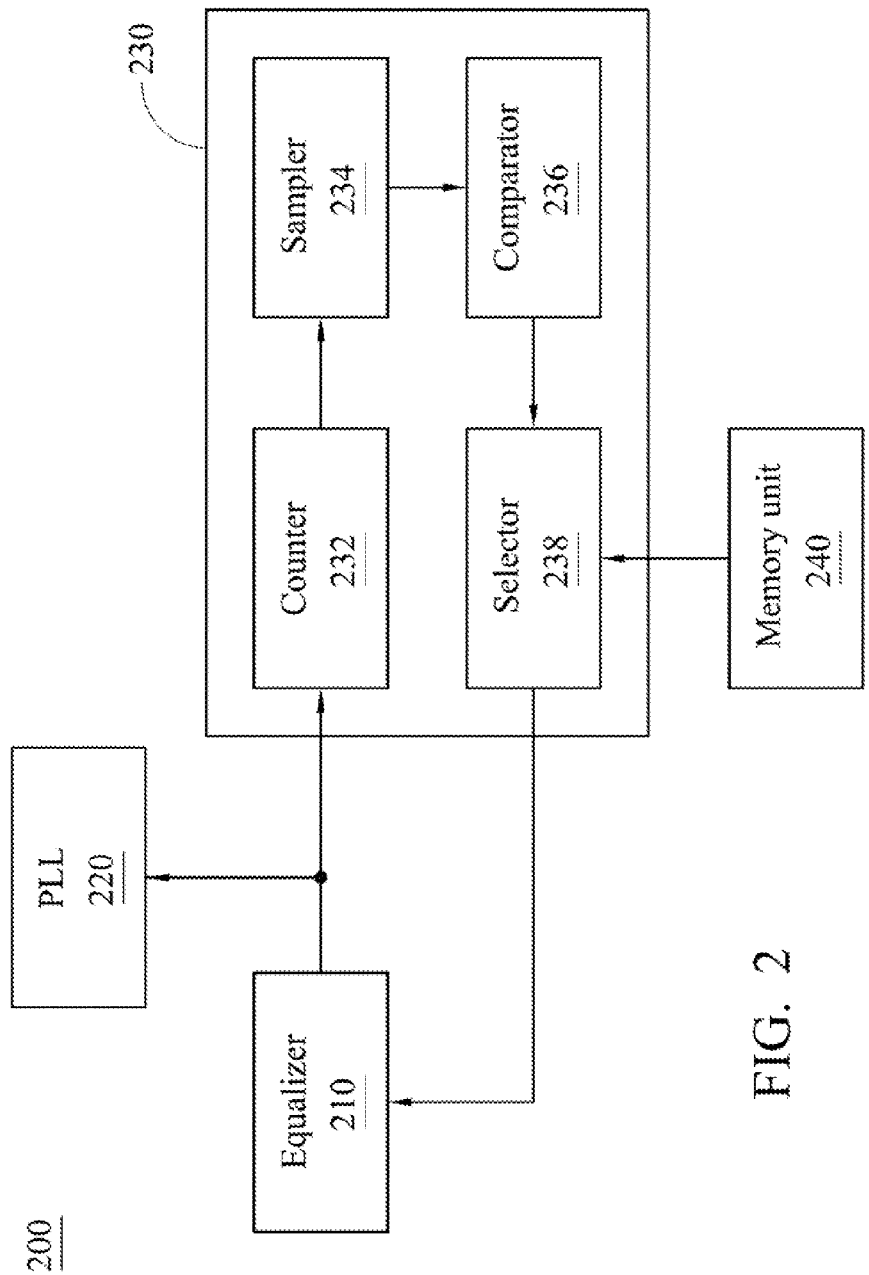
FIG. 2 is a schematic diagram of an equalizing system in accordance with another embodiments of the invention.

Referring to FIG. 2, which is a schematic diagram of an equalizing system 200 in accordance with another embodiments of the invention. In FIG. 2, the equalizing system 200 includes an equalizer 210, a PLL circuit 220, a detector 230 and a memory unit 240. The operations of the equalizer 210 and the PLL circuit 220 are respective the same as the equalizer 110 and the PLL circuit 120 shown in FIG. 1. The detector 230 may be one implementation the detector 130 shown in FIG. 1, which includes a counter 232, a sampler 234, a comparator 236 and a selector 238. The counter 232 counts rising or falling edges of the equalized transmission signal in a time period for the sampler 234 to determine a frequency of the equalized transmission signal. The comparator 236 compares the frequency of the equalized transmission signal at present time and the frequency of the equalized transmission signal at previous time to obtain a comparing result. The selector 238 determines a peaking level of the equalizer 210 for following equalization of the transmission signal in accordance with the comparing result. The memory unit 240 stores a look-up table that includes a set of levels for the equalizer 210 to equalize the transmission signal. In the present embodiments, the set of levels includes eight levels LV1-LV8, in which LV1>LV2>LV3 . . . >LV8, and the value of the level is in proportion to the amplifying power of the equalizer 210.

In operation of the equalizing system 200, the equalizer 210 applies a first level and a second level to equalize the transmission signal. The transmission signal is equalized with first level and the second level respectively at different times. A first signal is obtained by passing the transmission signal through the equalizer with the first level. A second signal is obtained by passing the transmission signal through the equalizer with the second level. The first level and the second level are respectively the level LV1 and the level LV2 in the set of levels. The counter 232 counts rising or falling edges of the first signal and the second signal in a time period. The sampler 234 determines a first frequency of the first signal and a second frequency of the second signal according to counting results from the counter 232.

The comparator 236 compares the first frequency and the second frequency to obtain a comparing result. If the comparing result indicates that the second frequency is substantially lower than the first frequency, the selector 308 determines the peaking level to be the second level for following equalization of the transmission signal. The second frequency substantially lower than the first frequency implies that the PLL circuit 220 locks to the correct phase and frequency according to the equalized transmission signal.

Otherwise, if the comparing result indicates that the second frequency is substantially the same as the first frequency, the selector 238 sets the second to level as the first level and sets a new level from the set of levels as the second level. The second frequency substantially the same as the first frequency implies that the PLL circuit 120 fails to lock to the correct phase and frequency. In such condition, the level for equalizing the transmission signal needs to be set lower. For illustration, if the comparing result indicates that the second frequency is substantially the same as the first frequency for the first time, the new level is the level LV3 in the set of levels. For another illustration, if the comparing result indicates that the second frequency is substantially the same as the first frequency for the second time, the new level is the level LV4 in the set of levels. The equalizer 210 equalizes the transmission signal with the first level and the second level to obtain the first signal and the second signal respectively, and then the counter 232, the sampler 234 and the comparator 236 repeats the aforementioned actions in relation to the first level and the second level. The first frequency and the second frequency are continuously determined and compared until the comparing result indicates that the second frequency is substantially lower than the first frequency.

By realizing the above disclosure of the equalizing system 200, the maximum peaking level is determined for that the PLL circuit 220 can lock to the correct phase and frequency of the transmission signal. Therefore, both high equalization gain for high-frequency component of the transmission signal without over-compensation and the correctness of frequency lock are ensured.

Figure 3:
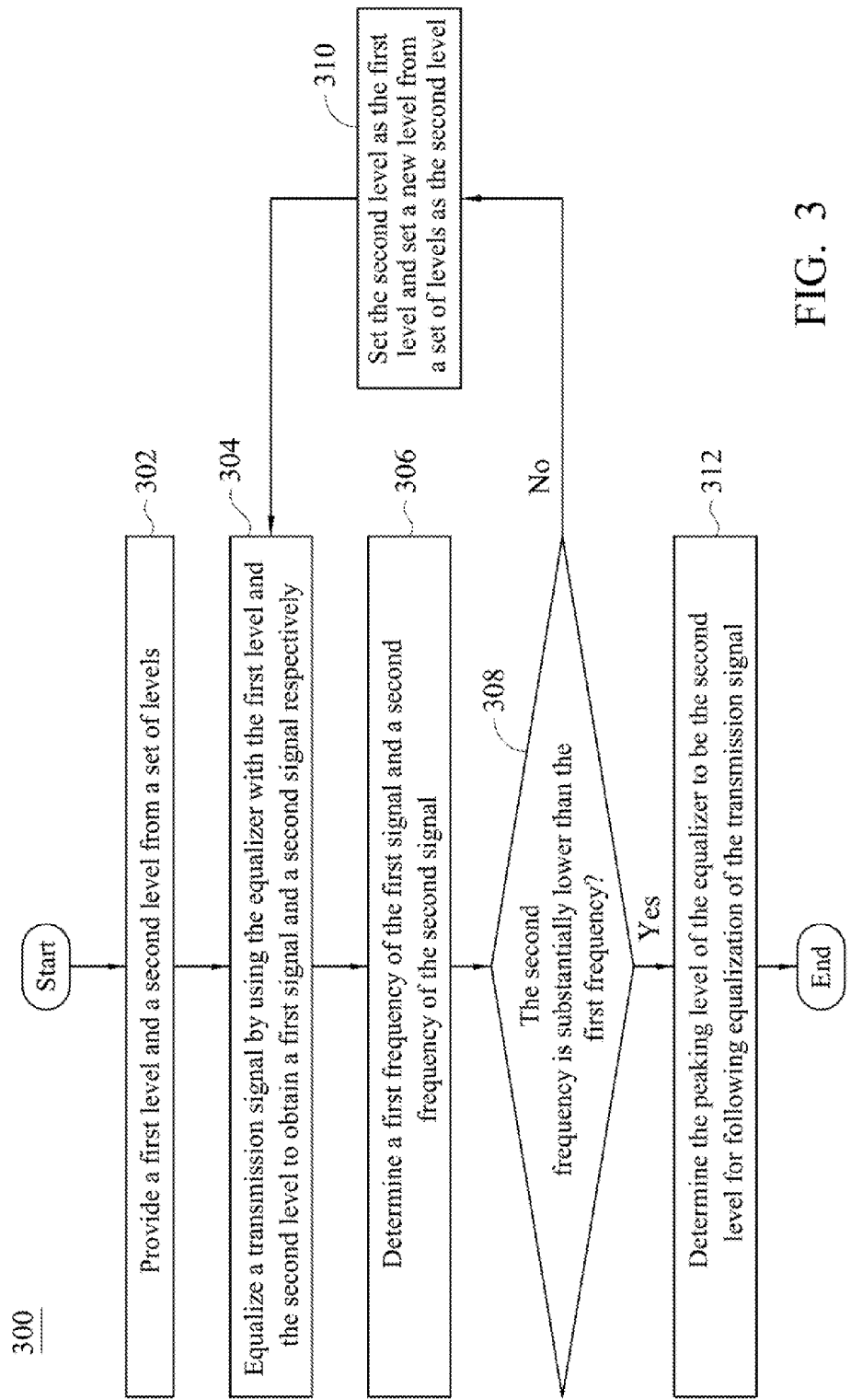
FIG. 3 is a flowchart diagram of a method for controlling an equalizer in accordance with some embodiments of the invention.

Referring to FIG. 3, which is a flowchart diagram of a method 300 for controlling an equalizer in accordance with some embodiments of the invention. The method 300 begins at operation 302. In operation 302, a first level and a second level from a set of levels are provided. The first level and the second to level are respectively the level LV1 and the level LV2 in the set of levels.

In operation 304, a transmission signal is equalized by using the equalizer with the first level and the second level to obtain a first signal and a second signal respectively. The transmission signal is equalized with first level and the second level respectively at different times.

In operation 306, a first frequency of the first signal and a second frequency of the second signal are determined. For illustration, the first frequency and the second frequency are determined by counting rising or falling edges of the first signal and the second signal in a time period.

In operation 308, the second frequency is compared with the first frequency to obtain a comparing result. If the comparing result indicates that the second frequency is substantially the same as the first frequency, operation 310 is performed. Otherwise, if the comparing result indicates that the second frequency is substantially lower than the first frequency, operation 312 is performed.

In operation 310, the second level is set as the first level, and a new level from a set of levels is set as the second level. Operation 304 is repeated after operation 310 is performed. For illustration, if the comparing result indicates that the second frequency is substantially the same as the first frequency for the first time, the new level is the level LV3 in the set of levels. For another illustration, if the comparing result indicates that the second frequency is substantially the same as the first frequency for the second time, the new level is the level LV4 in the set of levels.

In operation 312, a peaking level of the equalizer is determined to be the second level for following equalization of the transmission signal.

By performing the method 300, the maximum peaking level is provided for that a PLL circuit can lock to the correct phase and frequency of the transmission signal. Therefore, both high equalization gain for the transmission signal without over-compensation and the correctness of frequency lock are ensured.

Figure 4:
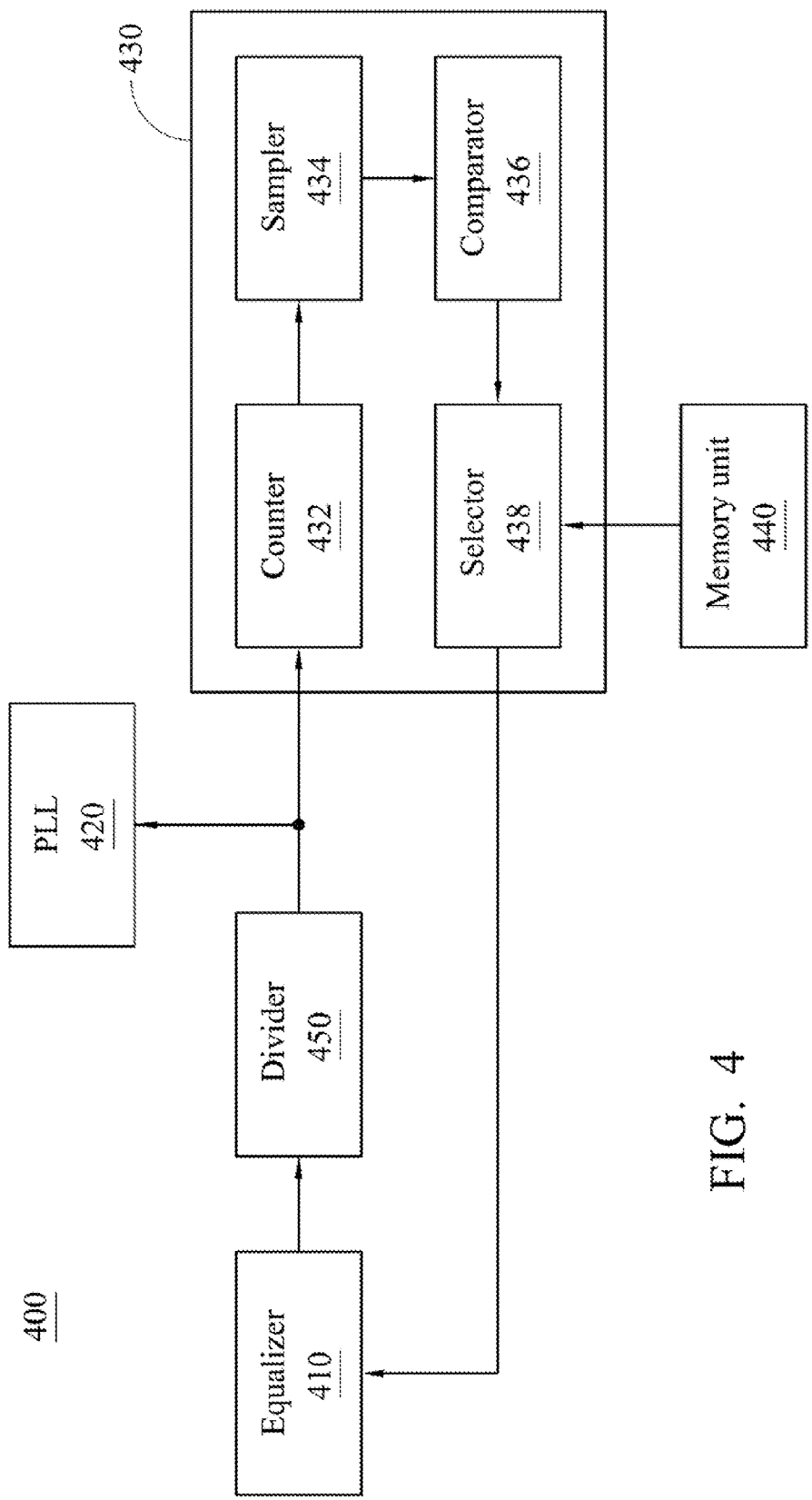
FIG. 4 is a schematic diagram of an equalizing system in accordance with another embodiments of the invention.

Referring to FIG. 4, which is a schematic diagram of an equalizing system 400 in according with another embodiments of the invention. In FIG. 4, the equalizing system 400 includes an equalizer 410, a PLL circuit 420, a detector 430, a memory unit 440 and a divider 450. The difference between the equalizing system 400 and the equalizing system 200 is that the equalizing system 400 further includes a divider 450 between the equalizer 410 and the detector 430. The operations of the equalizer 410, the PLL circuit 420, the detector 430 and the memory unit 440 are respective the same as the equalizer 210, the PLL circuit 220, the detector 230 and the memory unit 240 shown in FIG. 2. The divider 450 divides the frequency of the transmission signal. The dividing coefficient of the divider 450 may be adjusted according to various demands for desired frequency.

In summary, the equalizing system and method disclosed in the above embodiments includes equalized transmission signal detecting mechanism in which the equalized transmission signal is detected to determine if the correct phase and frequency of the transmission signal is locked. The peaking level of the equalizer is turned lower if the determination result indicates that the phase and frequency are not correctly locked. The peaking level continues being turned lower until the determination result indicates that the phase and to frequency are correctly locked. Therefore, both high equalization gain for high-frequency component of the transmission signal without over-compensation and the correctness of frequency lock are ensured.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for controlling an equalizer, comprising:
providing a first level from a set of levels as a peaking level of the equalizer;
equalizing a transmission signal by using the equalizer with the first level to obtain a first signal;
providing a second level from the set of levels as the peaking level of the equalizer;
equalizing the transmission signal by using the equalizer with the second level to obtain a second signal;
determining a first frequency of the first signal;
determining a second frequency of the second signal;
comparing the first frequency and second frequency to obtain a comparing result; and
determining the peaking level of the equalizer for following equalization of the transmission signal in accordance with the comparing result.

2. The method of claim 1, wherein if the comparing result indicates that the first frequency is substantially the same as the second frequency, the method further comprises:
setting the second level as the first level;
setting a new level from the set of levels as the second level; and
repeating the equalizing steps with the first level and the second level.

3. The method of claim 1, wherein the peaking level is determined to be the second level for following equalization of the transmission signal if the comparing result indicates that the second frequency is substantially lower than the first frequency.

4. The method of claim 1, wherein the second level is lower than the first level.

5. The method of claim 1, wherein the first frequency and the second to frequency is determined by counting rising or falling edges of the first signal and the second signal in a time period respectively.

6. The method of claim 1, wherein the set of levels is stored in a look-up table.

7. A circuit for controlling an equalizer, comprising:
a sampler for determining a first frequency of a first signal and a second frequency of a second signal, wherein the first signal is obtained from equalizing a transmission signal by using the equalizer with the first level as a peaking level of the equalizer, and the second signal is obtained from equalizing the transmission signal by using the equalizer with the second level as the peaking level of the equalizer;
a comparator coupled to the sampler, for comparing the first frequency and the second frequency to obtain a comparing result; and
a selector coupled to the comparator, for determining the peaking level of the equalizer for following equalization of the transmission signal in accordance with the comparing result.

8. The circuit of claim 7, wherein the first level and the second level are provided from a set of levels stored in a look-up table.

9. The circuit of claim 8, wherein if the comparing result indicates that the first frequency is substantially the same as the second frequency, the selector sets the second level as the first level and sets a new level from the set of levels as the second level, and the equalizer equalizes the transmission signal with the set first level and the set second level to obtain the first signal and the second signal respectively.

10. The circuit of claim 7, wherein the selector determines the peaking level to be the second level for following equalization of the transmission signal if the comparing result indicates that the second frequency is substantially lower than the first frequency.

11. The circuit of claim 7, wherein the second level is lower than the first level.

12. The circuit of claim 7, further comprising:
a counter coupled to the sampler, for counting rising or falling edges of the first signal and the second signal in a time period for the sampler to determine the first frequency and the second frequency respectively.

13. An equalizing system, comprising:
an equalizer for equalizing a transmission signal with a first level as a peaking level thereof to obtain a first signal, and for equalizing the transmission signal with a second level as the peaking level to obtain a second signal; and
a detector coupled to the equalizer, for detecting the first signal and the second signal, the detector comprising:
a sampler for determining a first frequency of the first signal and a second frequency of the second signal;
a comparator coupled to the sampler, for comparing the first frequency and the second frequency to obtain a comparing result; and
a selector coupled to the comparator, for determining the peaking level of the equalizer for following equalization of the transmission signal in accordance with the comparing result.

14. The equalizing system of claim 13, wherein the first level and the second level are provided from a set of levels stored in a look-up table.

15. The equalizing system of claim 14, wherein if the comparing result indicates that the first frequency is substantially the same as the second frequency, the selector sets the second level as the first level and sets a new level from the set of levels as the second level, and the equalizer equalizes the transmission signal with the set first level and the set second level to obtain the first signal and the second signal respectively.

16. The equalizing system of claim 14, further comprising:
a memory unit for storing the look-up table.

17. The equalizing system of claim 13, wherein the selector determines the peaking level to be the second level for following equalization of the transmission signal if the comparing result indicates that the second frequency is substantially lower than the first frequency.

18. The equalizing system of claim 13, wherein the second level is lower than the first level.

19. The equalizing system of claim 13, wherein the detector further comprises:
a counter coupled to the sampler, for counting rising or falling edges of the first signal and the second signal in a time period for the sampler to determine the first frequency and the second frequency respectively.

20. The equalizing system of claim 13, further comprising:
a divider coupled between the equalizer and the detector, for dividing the first signal and the second signal.

* * * * *